UNITED STATES PATENT OFFICE 2,023,001

CONCRETE

Karl P. Billner, New York, N. Y., assignor to Indurated Concrete, Incorporated, a corporation of New Jersey No Drawing. Application November 8, 1933, Serial No. 697,109

2 Claims. (Cl. 106—24)

My invention relates to improvements in concrete and my object is to produce concrete of great strength. Concrete has always been defined as a mixture of cement, sand and a heavy aggregate such as crushed rock or gravel but the proportions of these ingredients have varied, depending on the purpose for which the concrete is to be used and the strength required. A commonly used mixture is one part of cement, two parts of sand and four parts of gravel. This particular mixture is generally used for reinforced concrete. If the sand is comparatively coarse then the percentage of sand may be increased and the percentage of aggregate lessened in order to obtain high strength.

I have observed, speaking generally, that the crushing strength of the individual particles of the cement and sand and of the aggregate (crushed rock or gravel) is greater than that of a concrete of which they are components. That is to say a cement mortar made of one part cement and two parts sand will give a stronger material than a mixture of one part cement, two parts sand and four parts aggregate, such as crushed rock or gravel, in spite of the fact that the particles of the aggregate are generally stronger individually than a mixture of one part cement and two parts sand.

Since the individual particles of crushed rock or gravel are in general stronger than the mixture of cement and sand when hardened, it is my belief that the reason why the combined mixture of cement, sand and aggregate is weaker than its components is to be attributed to the fact that there is a weakness in the bond between the cement mortar and the gravel or other aggregate. I believe that this weakness is the result of slipping between the cement mortar and the gravel or other aggregate during settling. Whatever may be the cause of the weakness in question, I have discovered that a concrete of greatly increased strength can be secured by adding an ingredient to the mixture which increases the strength of the bond between the cement mortar and the gravel and other aggregate.

I find that this highly desirable result can be effected by adding to the mixture a very small quantity of an agent which produces a swelling effect during the setting of the concrete mass. This agent may be aluminum powder or any other substance which produces a similar or equivalent effect. If aluminum powder is used it may be employed in quantities less than .3 grams per pound of cement.

My tests and experiments have shown that from .03 to .3 grams of aluminum powder per pound of cement will give the best results.

I am, of course, aware that aluminum powder and other agents have heretofore been used for producing light weight concrete. In that art the aluminum powder or other agent has resulted in the formation of more or less uniformly distributed pores in the concrete mass, resulting in a product of light weight and of high insulating quality. A common property of all of these light weight porous concretes is that they have a low crushing strength as compared to ordinary concrete.

By means of my invention I do not produce a light weight concrete but obtain a product of about the same weight as ordinary concrete or possibly slightly less but which is greatly superior in strength to ordinary concrete.

The proportion of aluminum powder generally employed in making light weight porous concrete is of the order of one gram per pound of cement. To substantially increase the proportion of aluminum powder agent in my improved concrete would result in the formation of pores in the mass tending to reduce the weight and strength.

I have found that with my improved concrete the particles in the mix which have the greatest surface area as compared to their weight will travel furthest as a result of the internal pressure. Speaking generally, these are the individual grains of cement. Therefore under the effect of swelling a part of the cement will be forced against the surfaces of the coarse aggregate and against the surface of reinforcing steel if present and against the surfaces of the particles of sand.

The increase in bulk caused by the swelling action is very small being of the order of one-eighth of an inch in a cylinder six inches in length. With ordinary porous concrete the swelling may vary from fifty per cent to one hundred and fifty per cent.

The fact that the finest particles travel furthest as a result of internal pressure causes a thin layer of cement and fine sand to be brought to the surface of the concrete and this feature makes it possible to apply trowelling or other means for obtaining a smooth surface without resorting to the usual practice of applying a special screed coat of cement mortar.

Experiments have been made by me with test cylinders which have been crushed and it has been found that greatly increased strength is obtained with a mixture of cement, sand, gravel or other aggregate and a small proportion of aluminum powder as compared with the same mixture with the aluminum powder omitted.

I have also made tests to determine the character of the bond with reinforcing embedded in my improved concrete and have found that a very much stronger bond with the steel is obtained with my improved concrete than is secured with ordinary concrete.

It is to be understood that instead of using gravel or crushed rock as aggregates, manufactured aggregates may be employed such as burnt clay, shale, or slag.

Whatever aggregate is used the slight swelling during setting brought about by the use of a small proportion of aluminum powder or other agent appears to substantially increase the strength of the bond between the cement mortar and the aggregate, thus resulting in a very great increase in strength of the concrete when hard.

Having now described my invention what I claim as new therein and desire to secure by Letters Patent is as follows:

1. A concrete comprising cement, sand, an aggregate and powdered aluminum not exceeding 0.07 per cent of the weight of the dry cement powder.

2. A concrete comprising cement, sand, an aggregate and a gas generating agent producing a slight swelling effect by the generation of gas during setting, the proportion of the last named ingredient being sufficiently small as to result in a substantial strengthening of the concrete and insufficient to produce a substantial increase in volume.

KARL P. BILLNER.